(12) United States Patent
Shirokoshi

(10) Patent No.: US 8,020,299 B2
(45) Date of Patent: Sep. 20, 2011

(54) METHOD OF FASTENING GEAR AND STRUCTURE OF THE SAME

(75) Inventor: Norio Shirokoshi, Nagano-ken (JP)

(73) Assignee: Harmonic AD, Inc., Nagano-ken (JP)

( * ) Notice: Subject to any disclaimer, the term of this patent is extended or adjusted under 35 U.S.C. 154(b) by 1132 days.

(21) Appl. No.: 11/818,286

(22) Filed: Jun. 14, 2007

(65) Prior Publication Data
US 2008/0028612 A1 Feb. 7, 2008

(30) Foreign Application Priority Data

Aug. 1, 2006 (JP) ................................. 2006-210133

(51) Int. Cl.
*B21D 53/28* (2006.01)
(52) U.S. Cl. .......... 29/893.2; 29/520; 29/893; 29/893.1
(58) Field of Classification Search .............. 29/520, 29/893, 893.1, 893.2; 74/341, 348; 411/968
See application file for complete search history.

(56) References Cited

U.S. PATENT DOCUMENTS

| 2,821,863 A | * | 2/1958 | Bliss et al. | ........... | 74/348 |
| 3,100,333 A | * | 8/1963 | Friend | ........... | 29/893.1 |
| 7,387,462 B2 | | 6/2008 | Haecker | | |
| 2006/0075838 A1 | | 4/2006 | Hacker | | |

FOREIGN PATENT DOCUMENTS

| DE | 198 50 889 A1 | 5/2000 |
| DE | 103 16 155 A1 | 12/2003 |
| JP | 08-247223 | 9/1996 |

OTHER PUBLICATIONS

European Search Report dated May 11, 2009 (2 pages).

* cited by examiner

*Primary Examiner* — Richard Chang
(74) *Attorney, Agent, or Firm* — Flynn, Thiel, Boutell & Tanis, P.C.

(57) ABSTRACT

In a fastening method of press-fitting and fixing an axial end section of a second-stage pinion (1) into a circular opening (21) of a first-stage planetary carrier (2), first press-fitting external teeth (13a), which have an addendum circle larger than an addendum circle of the other pinion part and has a sharp tooth top, are generated through manufacturing of tooth-cutting at an outer circumferential section of the axial end portion of the second-stage pinion (1). Then, a press-fit bore (22) that has a smaller diameter than the addendum circle of the press-fitting external teeth (13a), is formed at the circular opening (21) of the first-stage planetary carrier (2). The press-fitting external teeth (13a) are then press-fitted into the press-fit bore (22) so that tooth tops thereof cut into an inner circumference surface of the press-fit bore (22) to secure fastening strength between the second-stage pinion (1) and the first-stage planetary carrier (2).

2 Claims, 3 Drawing Sheets

METHOD OF FASTENING GEAR AND STRUCTURE OF THE SAME

TECHNICAL FIELD

The present invention relates to a method of fastening a gear and a structure of fastening the gear, whereby a boss of a gear can be surely fastened into a circular opening of a counter-joint component without using a key, a knock pin, and so on.

BACKGROUND ART

A gear is generally fastened to a counter-joint component by press-fitting wherein a small-diameter boss formed at an axial end of the gear is press-fitted into a circular opening for press-fit which is formed in the counter-joint component. Such a method is disclosed in JP 8-247223 A, for example. When great fastening strength is required, for example as in a case where a gear is concentrically fastened to a rotational output shaft, a key, a knock pin, and so forth are used for securing enough fastening strength of the gear.

However, in some cases, design-wise it is impossible to have a space for installing such a key, a knock pin, and so on.

DISCLOSURE OF INVENTION

An object of the present invention is to provide a method of fastening a gear and a structure of fastening the gear with which sufficient fastening strength can be secured without using a key and a knock pin.

To solve the above and other problems, according to the present invention, there is proposed a method of fastening a gear wherein the gear is fastened to a counter-joint component by press-fitting and fixing an axial end portion of the gear into a circular opening of the counter-joint component, including the steps of:

forming a press-fitting external tooth part on the axial end portion of the gear by generating at a time of tooth cutting for the gear, wherein the press-fitting external tooth part is formed on its outer circumferential surface with press-fitting external teeth, an addendum circle of the press-fitting external teeth is larger than that of external teeth of the gear, and a tip shape of the press-fitting external teeth is made sharper than that of the external teeth of the gear;

forming a press-fit bore, which has a smaller diameter than the addendum circle of the press-fitting external teeth, at the circular opening of the counter-joint component;

and press-fitting the press-fitting external tooth part into the press-fit bore so as to have the press-fitting external teeth cut into an inner circumference surface of the press-fit bore.

Further, according to the present invention; a boss whose outer diameter is the same as a tooth root circle diameter of the press-fitting external tooth part, is protruded concentrically from an end surface of the press-fitting external tooth part; a boss press-fit bore for alignment, having a smaller diameter than the press-fit bore, is formed concentrically at the circular opening of the counter-joint component; and the press-fitting external tooth part is press-fitted and fixed into the press-fit bore while alignment between the gear and the counter-joint component being implemented by press-fitting the boss into the boss press-fit bore.

On the other hand, according to the present invention, there is provided a structure of fastening a gear characterized in which the gear is fastened according to the above-mentioned method.

According to the present invention, only the press-fitting external teeth on the axial end portion of the gear are generated at a time of tooth cutting so that the addendum circle thereof is made larger and the tops thereof are shaped to be sharper in comparison with the external teeth of the gear. The press-fitting external tooth part is press-fitted into a press-fit bore of the counter-joint component, so that the tooth tops of the press-fitting external teeth cut into an inner circumference surface of the press-fit bore, and fastening strength between the gear and counter-joint component can be secured.

Furthermore, according to the present invention, the boss is protruded concentrically from the press-fitting external tooth part, and the press-fitting external tooth part is press-fitted into the press-fit bore while the boss is press-fitted into the boss press-fit bore formed in the counter-joint component. Thus, the two members can be fastened with sufficient strength in a manner that miss-alignment therebetween is avoided.

DESCRIPTION OF THE PREFERRED EMBODIMENTS

An example of a method of fastening a gear according to the present invention is described below with reference to the drawings.

Figure 1:
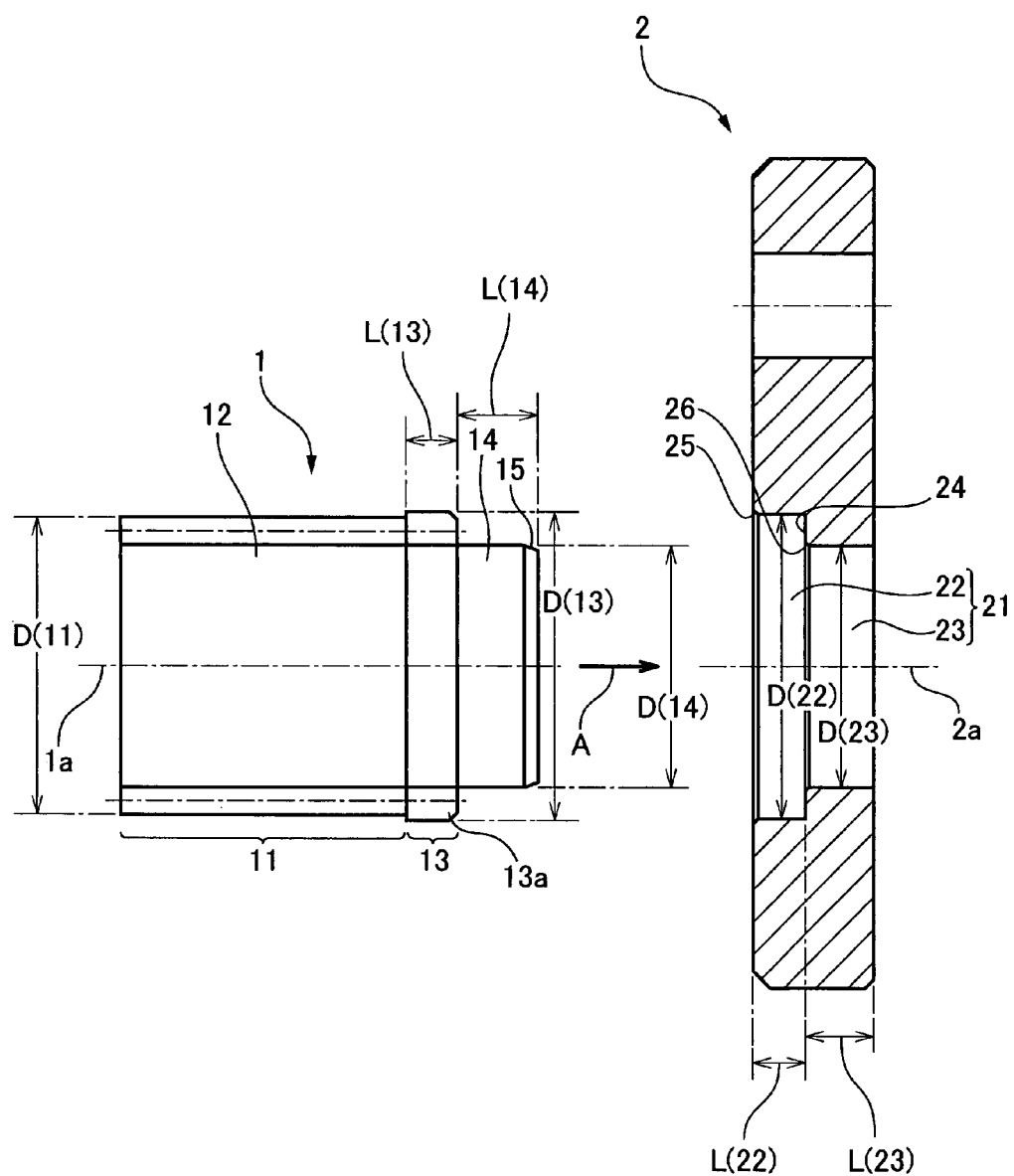
FIG. 1 is an explanatory view showing a fastening method in which a second-stage pinion is fastened into a first-stage planetary carrier according to the present invention.

FIG. 1 is an explanatory view that shows a method of fastening a gear of this embodiment, and FIG. 2 is an explanatory view showing the obtained gear fastening structure. With reference to FIG. 1, a reference numeral 1 denotes a gear that is, for example, a second-stage pinion of a double stage planetary gear device. A reference numeral 2 denotes a counter-joint component that is, for example, a first-stage planetary carrier of the double stage planetary gear device.

The second-stage pinion 1 has a pinion main part 12 formed with external teeth 11 having a prescribed addendum circle. The pinion main part 12 is formed with press-fitting external tooth part 13 adjacent to the external teeth 11. The press-fitting external tooth part 13 is formed on its circumferential outer surface with press-fitting external teeth 13a whose addendum circle is a little larger than that of the external teeth 11. The press-fitting external teeth 13a are formed by gear generating process at a time of tooth cutting of the external teeth 11 so that their tooth tops are sharpened compared to the external teeth 11. Namely, the press-fitting external teeth 13a having such a shape can be obtained by designing the addendum circle at the axial end portion of the pinion 1 to be larger by a certain width and by using a hob cutter or a grinding wheel in which the tooth bottom is shaped so as to have a special V-form to carry out tooth cutting. Furthermore, the second-stage pinion 1 of this embodiment has a boss 14 which protrudes concentrically from an end surface of the press-fitting external tooth part 13. The diameter of the boss 14 is the same as the tooth root circle diameter of the press-fitting external tooth part 13. The boss 14 is formed on its outer circumferential edge with a tapered surface 15.

For example, the addendum circle D(11) of the external teeth 11 of the second-stage pinion 1 is 17.6 mm in diameter. A diameter D (13) of an envelope of a top edge of the press-fitting external teeth 13a, obtained as a result of gear generating, is 17.8 mm, and a width (axis length) L(13) of the press-fitting external teeth 13a along the axis line 1a is 3 mm. The outer diameter D(14) and axial length L(14) are 14 mm and 4.5 mm, respectively.

On the other hand, the first-stage planetary carrier 2 is formed with a circular opening 21 passing through its center. A press-fit bore 22 is formed on one end side of the circular opening 21 along the axial line 2a, and a boss press-fit bore 23 is formed on the other end side thereof. The boss press-fit bore 23 has a smaller diameter than the press-fit bore 22. A circular step surface 24 is formed between the press-fit bore 22 and the boss press-fit bore 23. The press-fit bore 22 has an opening edge part defined by a tapered surface 25 and an opening edge part of the boss press-fit bore 23 is also defined by a tapered surface 26.

The press-fit bore 22 has the inner diameter D(22) made to be smaller than the outer diameter D(13) of the press-fitting external tooth part 13 that is obtained by gear-generating method, whereby the inner diameter D(22) is set to have a dimension that enables the tooth tops of the press-fitting external teeth 13a of the press-fitting external tooth part 13 to cut into with an adequate cutting-into allowance. The axial length L(22) of the press-fit bore 22 is equal to the length of the press-fitting external tooth part 13, and the inner diameter D(23) of the boss press-fit bore 23 is the same as the outer diameter D(14) of the boss 14.

In a case where the second-stage pinion 1 has the above-mentioned dimensions, the inner diameter D(22) of the press-fit bore 22 at the circular opening 21 of the first-stage planetary carrier 2 is so designed as to be an inner diameter with which a cutting-into allowance of about 0.05 to 0.07 mm can be obtained; for example, the inner diameter D(22) is 17.6 mm, and the axial length L(22) is 3 mm for example. The inner diameter D(23) of the boss press-fit bore 23 is 14 mm and the axial length L(23) thereof is 4 mm, for example.

The second-stage pinion 1 and the first-stage planetary carrier 2 are manufactured so as to have shapes and dimensions as described above. Then, as shown by an arrow A in the drawing, the axial end portion of the second-stage pinion 1 is press-fitted into the circular opening 21 of the first-stage planetary carrier 2. Press-fitting is carried out under a condition where the boss 14 is inserted into the boss press-fit bore 23 so that there is no miss-alignment caused between the second-stage pinion 1 and the first-stage planetary carrier 2.

Figure 2A:
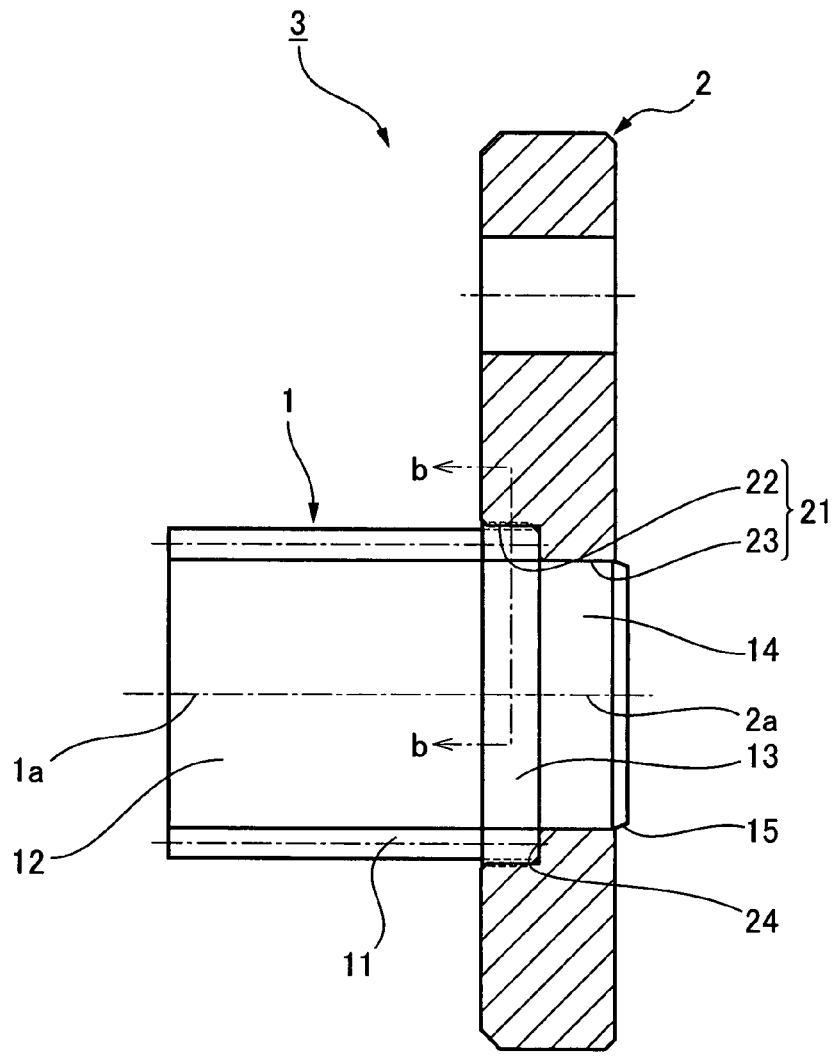
FIG. 2A is a longitudinal sectional view showing a fastening structure in which a second-stage pinion has been fastened into a first-stage planetary carrier by applying the present invention.
Figure 2B:
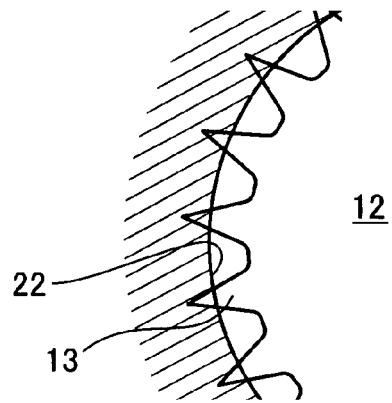
FIG. 2B is a schematic view showing a condition in which the second-stage pinion and the first-stage planetary carrier are fastened.

When the press-fitting external tooth part 13 of the second-stage pinion 1 is press-fitted into the press-fit bore 22, the sharp tooth tops of the press-fitting external teeth 13a cut into the inner circumference surface of the press-fit bore 22, as schematically shown in FIG. 2B. As a result, a gear fastening structure 3 in which the second-stage pinion 1 is fastened into the first-stage planetary carrier 2 with large fastening strength as shown in FIG. 2A can be obtained.

Figure 3:
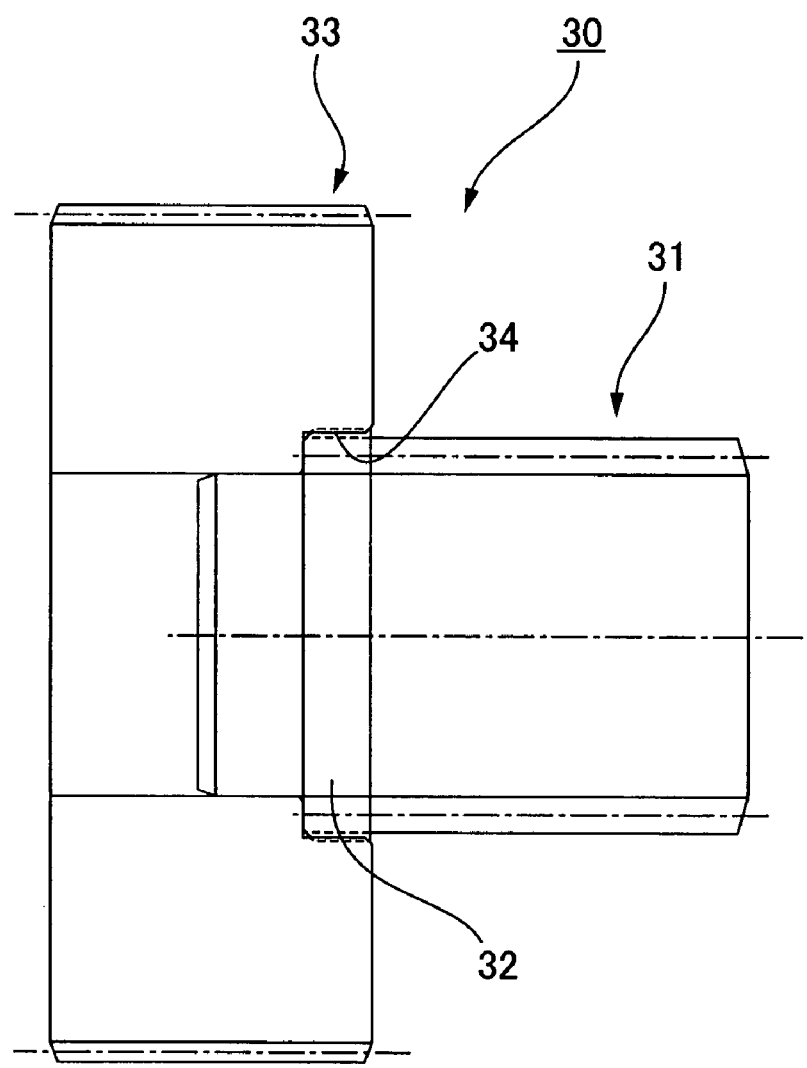
FIG. 3 is an explanatory view showing an example in which the present invention has been applied for a stepped gear.

The present invention can also be applied, for example, to manufacturing a stepped gear. Conventionally, manufacturing a stepped gear depends on a manufacturing method using a pinion cutter. When a method of the present invention is applied for the purpose, the stepped gear is split and each split gear is manufactured through tooth-cut manufacturing using a hob cutter or a grinding wheel, and then finished. For example, as shown in FIG. 3, a press-fitting external tooth part 32 having a larger addendum circle is formed at an axial end portion of a first split gear 31, and a press-fit bore 34 is formed at a center of a second split gear 33. Then, the press-fitting external tooth part 32 is press-fitted and fixed into the press-fit bore 34 to have a stepped gear 30 assembled integrally. According to the method described above, the stepped gear 30 with high accuracy can be obtained inexpensively.

Incidentally, needless to describe, a method of fastening a gear according to the present invention can also be applied even for a case where a counter-joint component is any other component than a planetary carrier and a gear.

The invention claimed is:

1. A method of fastening a gear wherein the gear is fastened to a counter-joint component by press-fitting and fixing an axial end portion of the gear into a circular opening of the counter-joint component, the method including the steps of:
   forming a press-fitting external tooth part on the axial end portion of the gear by generating at a time of tooth cutting for the gear, wherein the press-fitting external tooth part is formed on an outer circumferential surface with press-fitting external teeth, an addendum circle of the press-fitting external teeth is larger than that of external teeth of the gear, and a tip shape of the press-fitting external teeth is made sharper than that of the external teeth of the gear;
   forming a press-fit bore, which has a smaller diameter than the addendum circle of the press-fitting external teeth, at the circular opening of the counter-joint component;
   and press-fitting the press-fitting external tooth part into the press-fit bore so as to have the press-fitting external teeth cut into an inner circumference surface of the press-fit bore.

2. The method of fastening a gear according to claim 1, wherein a boss, whose outer diameter is same as a tooth root circle diameter of the press-fitting external teeth, is protruded concentrically from an end surface of the press-fitting external tooth part, and wherein a boss press-fit bore for alignment, having a smaller diameter than the press-fit bore, is formed concentrically at the circular opening of the counter-joint component;
   the method further including the step of:
   fixing the press-fitting external tooth part into the press-fit bore while alignment between the gear and the counter-joint component being implemented by press-fitting the boss into the boss press-fit bore.

* * * * *